United States Patent [19]

Geraci

[11] 4,045,118
[45] Aug. 30, 1977

[54] DRAPE FOR OPERATING MICROSCOPE

[75] Inventor: James Leonard Geraci, Cincinnati, Ohio

[73] Assignee: Xomed, Inc., Cincinnati, Ohio

[21] Appl. No.: 282,409

[22] Filed: Aug. 21, 1972

[51] Int. Cl.² ............................................. G02B 23/16
[52] U.S. Cl. ..................................... 350/61; 350/65; 350/67
[58] Field of Search ............................. 350/61, 65, 67

[56] References Cited

U.S. PATENT DOCUMENTS

| 3,528,720 | 9/1970 | Treace | 350/61 |
| 3,542,450 | 11/1970 | Terhune | 350/65 |
| 3,698,791 | 10/1972 | Walchle et al. | 350/61 |

Primary Examiner—David H. Rubin
Attorney, Agent, or Firm—J. Warren Kinney, Jr.

[57] ABSTRACT

A microscope drape fabricated from a very thin, transparent, heat-resistant plastic film which is adapted to completely house an operating microscope including its support arms, is provided with an improved tubular ocular housing extension, the free outer end of which terminates in a pull tab which serves not only to facilitate positioning of said tubular portion over an ocular, but also to facilitate removal of said pull tabs whereby to accurately and effectively position the free outer end of the ocular housing extension remaining after removal of the tab portion closely adjacent to the outer ends of the eyepieces of the oculars.

3 Claims, 8 Drawing Figures

U.S. Patent  Aug. 30, 1977  4,045,118
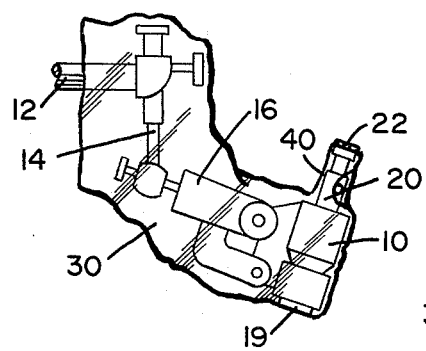
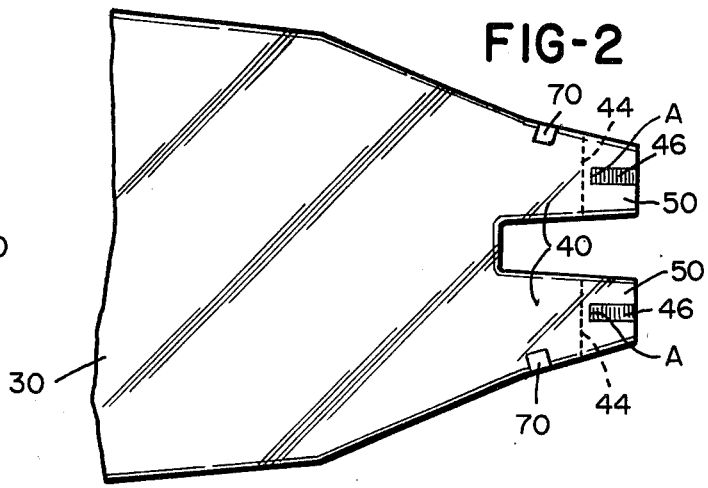
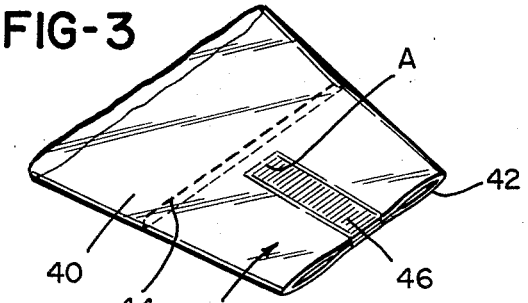
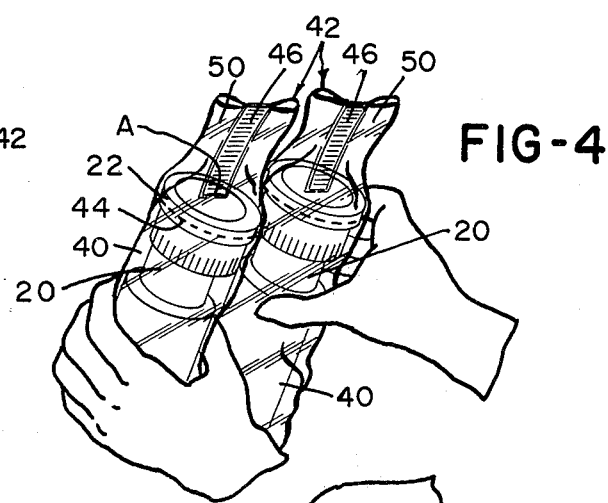
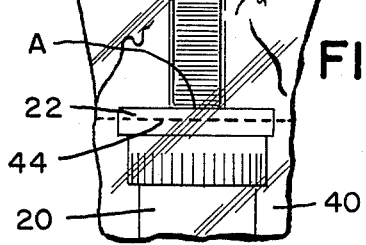
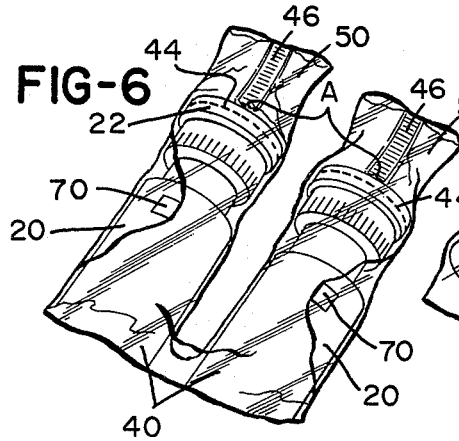
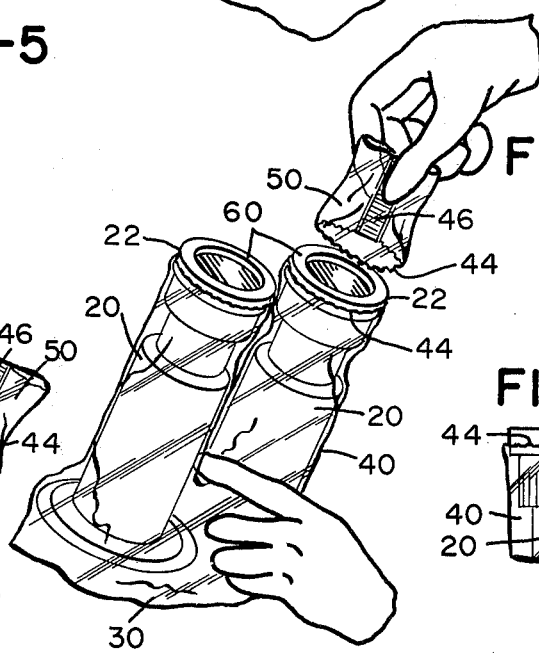
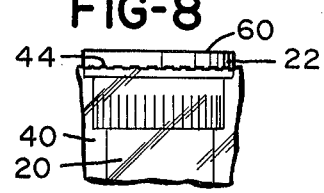

DRAPE FOR OPERATING MICROSCOPE

BACKGROUND OF THE INVENTION

The field of the invention relates to a sterilized, disposable drape for an operating microscope including its support arm and in particular to an improvement in the structural details of that portion of the drape which embraces the oculars of the microscope.

DESCRIPTION OF THE PRIOR ART

U.S. Pat. No. 3,528,720 discloses a disposable drape for an operating microscope which includes closed-ended tubular sleeve portions which are adapted to receive and house the eyepiece projections or oculars, of a microscope after which the closed ends are removed for uncovering and completely exposing the viewing apertures of the eyepiece.

U.S. Pat. No. 3,542,450 discloses a sock-envelope of flexible material having open-ended sock-like eyepiece members 51, 51', which are adapted to fit around microscope eyepiece projections or oculars.

SUMMARY OF THE INVENTION

The microscope drape of the present invention is directed to an improvement in the structural details of and method of using those portions of a microscope drape in which the oculars, including the eyepiece sections, are housed. Since the medical profession prefers to avoid any material, even though transparent, which covers the eyepiece of an ocular during those periods of time when the microscope is in use, it has been customary to provide open-ended sock-like members as in U.S. Pat. No. 3,542,540, or with initially closed-ended sock-like members as in U.S. Pat. 3,528,720 which, after being associated with an ocular, are adapted to have the closed-ends torn therefrom for exposing the eyepiece of the ocular.

Since the purpose of a sterile drape is to afford maximum protection to the patient, it is highly desirable, if not imperative, that the entire outer surface of the oculars immediately adjacent and beneath the upper surface of the eyepiece be covered or housed within sterile drape material. It is also highly important, if not critical, that a microscope drape be capable of being quickly, easily and accurately associated with the oculars of the microscope in such a manner that the upper, open, peripheral edge of the ocular-encircling drape is positioned at the top most or free outer end of the ocular at the eyepiece thereof, without requiring acts of judgement on the part of the operating room nurse.

The ocular housing of the drape of the subject invention comprises an open ended tubular member the free outer end of which terminates in an axial pull tab portion which is defined by internally interconnected portions of the tubular member, and wherein the lower or innermost end of the internally interconnected portions define and provide a positive abutment, locating point or stop which will accurately determine the relationship between the outer, open, peripheral edge of the ocular drape with respect to the eyepiece of the ocular, after the pull tab portion thereof has been torn or otherwise disassociated from the other portions of the tubular member.

Specifically, the invention contemplates the use of an internal, elongate, axial seal capable of securing diameteral portions of the interior of the tubular housing of the drape in closed, flat, contacting relationship, wherein the inner or lowermost edge of said sealed portion comprises, in conjunction with other portions of the tubular portion, an abutment which determines and limits the degree of penetration of the eyepiece of an ocular into the tubular, ocular receiving portion of the drape. Then, after the tubular housing has thus been accurately and precisely associated with and relative to the eyepiece of an ocular, the adhered portions, which project outwardly from the end of the eyepiece, constitute a convenient, readily accessible pull tab or finger grip portion which may be readily grasped by an operating room nurse for severing the end of the tubular portion of the drape along a circumferential perforation for thereby providing an open, substantially circular, peripheral end to the tubular ocular housing wherein said peripheral end is disposed in desired relationship with respect to the outer surface of the eyepiece of the oculars.

DESCRIPTION OF THE DRAWINGS

FIG. 1 is a schematic side view of a typical operating microscope having a disposable, sterile drape operatively associated therewith.

FIG. 2 is a plan view of that portion of the drape containing the ocular housings, which comprises the subject matter of the present invention.

FIG. 3 is a perspective view of the outer end of an ocular drape housing emboding the teachings of the present invention.

FIG. 4 is a perspective view illustrating the manner in which the housings are associated with the oculars of a microscope drape.

FIG. 5 is a view, on an enlarged scale illustrating the relationship of the outer end of the ocular housing with respect to the eyepiece of an ocular, after the drape has been applied to the oculars as in FIG. 4.

FIG. 6 illustrates the manner in which the ocular drape housings are secured to and in locking relationship on the oculars.

FIG. 7 is a view similar to FIG. 6 but showing the manner in which the ends of the ocular drape housings are removed for providing the desired relationship between the outer, open, peripheral ends of the ocular housing with respect to the eyepiece of the oculars.

FIG. 8 is a side view, on a slightly enlarged scale, showing the relationship of the outer end of an ocular housing after the pull tab end has been removed.

PREFERRED EMBODIMENT OF THE INVENTION

In FIG. 1, the numeral 10 denotes generally a conventional operating microscope which is adjustably mounted relative to an upright, or other member, not illustrated, by means of a support arm which may comprise a series of interconnected elements 12, 14, 16 and 18 which are articulated in such a manner as to enable the user of the microscope to adjust it in any desired position for enabling an observer looking into eyepiece 22 of oculars 20 to examine various portions of a patient to be treated and/or operated on. The microscope includes an objective lens 19 and an illuminating lamp, not illustrated, it being understood that the microscope, in its entirety, comprises a standard or conventional piece of medical equipment which constitutes no part of the subject invention.

The numeral 30 denotes generally an elongate drape fabricated from thin, preferably transparent, copolymer sheet material of the type which is capable of withstanding temperatures up to 300° F. without injurious effects, such as, by way of example, the drape as illustrated in co-pending patent application, Serial No. 135,108, assigned to the assignee of this application. Reference may be had to said pending application for a complete and detailed description of the manner in which the microscope drape is associated with the microscope, its support means, oculars 20 and objective lens 19.

The subject invention is directed to an improvement in the structural details of that portion of the drape which embraces the oculars of the microscope, said ocular housing portions being denoted by the numeral 40. Each ocular housing 40 comprises a substantially tubular portion having an open, free outer end 42, and a row of perforations 44 which completely circumscribe tubular portion 40, wherein the perforations are spaced inwardly from the free outer end 42 of tubular portion 40. The inner walls of the outer ends of tubular portion 40 are internally interconnected such as, by means of a heat seal, or the like, which defines a centrally disposed, closed, flattened area 46 which provides a tab pull portion 50.

The relationship between lower end A of central portion 46 and the row of perforations 44 is such that the perforations will be disposed in substantial alignment with, but preferably just slightly below, outer edge 60 of lens portion 22 of the ocular 20, note FIGS. 5, 7 and 8. In other words, lower end A of central portion 46 of the pull tab functions as an abutment which positively and automatically determines the preferred relationship of the line of perforations 44 with respect to the free outer end 60 of eyepiece 22 of ocular 20, as best illustrated in FIG. 4.

After the tubular member has been pulled over ocular 20, to the extent permitted by central, flattened, closed portion 46, a protective strip on tab 70 of FIG. 2 is removed for exposing an adhesive surface of the tab. The operating room nurse merely provides a tuck in the tubular housing member 40, which tuck is disposed over and pressed against the exposed adhesive surface of tab 70 for securing the tubular housing in positive, snug, circumferential engagement with the outer surface of ocular 20, as illustrated in FIG. 6. In this manner the cylindrical housing portions 40 engage oculars 22 with sufficient tightness to preclude the transmittal and or escape of heated air from the interior of the drape via said tubular housing member. It should, of course, be understood that other means, such as elastic bands, tie strings, and the like, may be utilizied for securely, though releaseably, fixing the ocular housing to the side wall of the ocular, without departing from the spirit of the invention, however, the use of a tab, such as 70, is preferred.

After housing portion 40 has been suitably secured relative to ocular 20, the end tab 50 may be quickly, conveniently and accurately removed along perforation 44, as illustrated in FIG. 7, by grasping central portion 46 between the fingers and pulling whereby the outer end of tubular portion 20 as defined by the torn, perforated line 44, will be located closely adjacent, but spaced slightly below, outer end 60 of eyepiece 22.

In operating room procedures, time and efficiency are of the essence and the pull tab disclosed herein enables the operating room nurse to quickly, accurately and automatically dispose the location of the tear line perforations in proper relationship with respect to the free outer end of the viewing apertures of the eyepiece of an ocular of an operating microscope by merely pulling the tubular ocular housing downwardly over the ocular as far as it will go, that is, until further downward movement is prevented by reason of the outer end of the ocular engaging or abutting the constricted interior of the tubular housing adjacent the inner end A of the central, closed, flattened area 46. The aforesaid procedure automatically locates the line of perforations 44 in proper, predetermined relationship with the outer end of the oculars, and after the loose portions of the ocular housing have been secured relative to the side walls of the ocular, the end of the ocular housing may be easily removed, as illustrated in FIG. 7 for providing the results illustrated in FIG. 8 whereby the maximum area of the ocular is housed within the sterile drape material, and wherein the apertures of the ocular eyepiece are completely exposed for viewing by the surgeon.

With particular reference to FIG. 4, it will be noted that the overall width of axial strip 46 is substantially less than the radius of tubular portion 40. It will also be noted that those portions of the ocular housing along opposite sides of axial strip 46 are in free, open communication with the interior of tubular portion 40 when the tubular portions are pulled over the oculars, thereby facilitating the introduction of the oculars into the ocular housing. The aforesaid open communication prevents the build-up of air pressure within the drape while it is being associated with the microscope.

It should be understood that the present invention contemplates the use of means other than an elongate axial strip 46 for providing a combination pull tab and abutment or stop means interiorly of tubular portion 40 outwardly of tear line 44, such as, by way of example any constricting means which will establish an abutment at A which is so related to the location of perforations 44 as to insure that the locus of the tear line as defined by said perforations will be disposed at or closely adjacent the free outer end 60 of ocular eyepiece 22 when the ocular has been fully introduced into the ocular housing 40, as in FIGS. 4 and 6.

What is claimed is:

1. A drape for enclosing an operating microscope having an objective lens and an elongate ocular which terminates in a free outer end, said drape including an elongate, tubular portion dimensioned to loosely receive the ocular of the microscope, the free outer end of said tubular portion including a centrally disposed, elongate, partially closed, flattened area defining a pull tab portion, a circumferential tear line in said tubular portion spaced inwardly from the innermost end of said pull tab portion, wherein the relationship between the innermost end of the pull tab portion and said circumferential tear line are such that said tear line will be disposed closely adjacent the free outer end of the ocular when the ocular has been introduced into said tubular portion to the extent permitted by interference between the free outer end of the ocular with the constricted interior of the ocular housing adjacent the lower end of said pull tab.

2. In a disposable microscope drape for positioning over an operating microscope in enclosing relationship thereto and comprising an elongate, continuous, substantially tubular drape open at one end and terminating at the other end in at least one elongate, outwardly projecting cylinder-defining ocular housing for receiving the ocular of the microscope, the improvement in said ocular housing which comprises the provision of a circumferential tear line in and spaced from the free outer end of said ocular housing, and an elongate, axial strip of a width substantially less than a radius of said tubular housing portion interconnecting opposite sides of the interior of said housing at a location between said tear line and the free outer end thereof, said interconnected portion defining a pull tab, and those portions of the ocular housing along opposite sides of said axial strip being in open communication with the interior of said ocular housing.

3. In a disposable microscope drape for positioning over and in enclosing relationship with an operating microscope, and comprising an elongate, continuous, substantially tubular drape open at one end and having adjacent the other end at least one elongate, outwardly projecting cylinder-defining ocular housing for receiving the ocular and the ocular-associated eyepiece of the microscope, which ocular housing includes a circumferential tear line spaced from the free outer end thereof; the improvement in said housing which comprises means interconnecting opposite sides of portions of the interior of said housing at a location between said tear line and the free outer end of said ocular housing wherein an interconnected portion of said housing constitutes an abutment spaced outwardly from said tear line which limits the extent to which an ocular may be inserted into said housing, said abutment defining and accurately establishing the location of the tear line with respect to the upper end of the eyepiece of an ocular contained within said housing, and the interconnected portions of the ocular housing defining pull tab means which are adapted to be grasped for severing those portions of the ocular housing outwardly beyond the tear line from those portions of the housing inwardly of said tear line for providing an uninterrupted open end to said last mentioned portion of the housing wherein said open end is disposed substantially at and in the plane of the upper end of the eyepiece of the ocular.

* * * * *